(12) United States Patent
Lane

(10) Patent No.: US 7,058,193 B2
(45) Date of Patent: Jun. 6, 2006

(54) MICROPHONE ASSEMBLY FOR A VEHICLE HANDS-FREE TELEPHONE

(75) Inventor: Peter Lane, Otzberg (DE)

(73) Assignee: ArvinMeritor GmbH (DE)

( * ) Notice: Subject to any disclaimer, the term of this patent is extended or adjusted under 35 U.S.C. 154(b) by 315 days.

(21) Appl. No.: 10/354,446

(22) Filed: Jan. 30, 2003

(65) Prior Publication Data

US 2004/0204167 A1    Oct. 14, 2004

(30) Foreign Application Priority Data

Jan. 30, 2002    (DE) ............................... 102 03 599

(51) Int. Cl.
*H04R 25/00*    (2006.01)

(52) U.S. Cl. .................. 381/365; 381/361; 381/355; 381/86; 379/420.03; 379/446

(58) Field of Classification Search .............. 381/361, 381/365, 355, 86, 334; 455/574.9; 379/454, 379/428, 420.03, 446; 248/549; 224/929
See application file for complete search history.

(56) References Cited

U.S. PATENT DOCUMENTS

| | | |
|---|---|---|
| 5,687,230 A | 11/1997 | Olausson et al. |
| 6,094,496 A * | 7/2000 | Stowers, Sr. ................ 381/362 |
| 6,108,566 A | 8/2000 | Albanese et al. |
| 6,111,964 A | 8/2000 | Ishibashi |

FOREIGN PATENT DOCUMENTS

| | | |
|---|---|---|
| DE | 4220016 | 12/1993 |
| DE | 198 01 300 A1 | 7/1999 |
| DE | 19647405 | 10/1999 |
| DE | 100 43 918 A1 | 3/2001 |
| DE | 100 33 985 A1 | 5/2001 |
| DE | 100 37 346 A1 | 2/2002 |
| JP | 55143851 A | 11/1980 |
| WO | WO 96/31994 | 10/1996 |

OTHER PUBLICATIONS

International Search Report dated Feb. 7, 2002.

* cited by examiner

*Primary Examiner*—Suhan Ni
*Assistant Examiner*—Tuan D. Nguyen
(74) *Attorney, Agent, or Firm*—Carlson, Gaskey & Olds

(57) ABSTRACT

A microphone assembly of a vehicle hands-free telephone comprises a guide and a microphone unit. The microphone unit moves between a retracted position and an extended position relative to the guide. The microphone may be activated in the extended position and deactivated in the retracted position.

20 Claims, 4 Drawing Sheets

MICROPHONE ASSEMBLY FOR A VEHICLE HANDS-FREE TELEPHONE

TECHNICAL FIELD

The invention relates to a microphone assembly for a vehicle hands-free telephone

BACKGROUND OF THE INVENTION

A microphone assembly used in a hands-free telephone may be installed as original equipment with the vehicle or, alternatively, retrofitted into the vehicle as aftermarket equipment. In the past, the microphone assembly has been attached to the A-column of the vehicle interior through a mounting screw, or integrated as part of an interior lighting unit. However, a microphone attached to the A-column protrudes above the interior lining of the A-column making the lining susceptible to tearing. On the other hand, making the microphone assembly part of the lighting unit requires expensive shielding to insulate the assembly from vehicle vibrations and oscillations. In either installation, the reception quality of the microphone assembly is low because the assembly is not directed toward the source of relevant sound, i.e., a vehicle occupant. The A-column is near the foot space, while the lighting unit is above the driver.

BRIEF SUMMARY OF THE INVENTION

The inventive microphone assembly for a hands-free telephone has a guide for the microphone. In contrast to existing vehicle microphone assemblies, the guide permits the inventive microphone to be retracted and extended from its base. Extending the microphone allows a user to move and orient the microphone closer to his mouth to thereby improve acoustic reception. Retracting the microphone permits the user to hide the microphone so that it does not project far above the lining of the vehicle interior, preventing accidental tearing of the lining.

Preferably, the microphone is automatically switched "on" when extended and switched "off" when retracted. In this way, the microphone may be activated and deactivated by its simply retraction and extension. Alternatively, the microphone assembly may have an actuation switch, such as an "on/off" knob.

Locating the microphone close to the user, such as a vehicle driver, allows the driver to conveniently and safely activate or deactivate the microphone. Unlike prior designs, the inventive microphone assembly does not require the driver to orient himself toward the A-column, or lighting unit, to address the microphone.

It is preferred that the guide has a bushing surrounding the microphone. The microphone may retract into the bushing. Once retracted, the microphone preferably projects only slightly above the bushing.

Moreover, the inventive microphone assembly may incorporate a fastening device that attaches the microphone assembly to an opening in a lining of the vehicle interior as a pre-assembled unit. The fastening device may be a latch that secures the entire microphone assembly in the opening in the lining by simply pushing the assembly into the opening.

The microphone assembly may also incorporate a drive that extends the microphone without power from the vehicle's electrical system. Such a feature simplifies installation. For example, the assembly may have a spring that permits the user to push the microphone into a retracted position and thereby compress the spring. Upon release of the compressed spring by the user, the decompressing spring drives the microphone to its extended position. Preferably, the spring is a "pop out" device that extends the microphone by pressing it to release the compressed spring. Friction between the microphone and the guide may slow extension of the microphone in such an assembly.

Once released, the spring holds the microphone at its extended position through a pre-tensioning force generated by the spring. The microphone assembly may also swivel while extended. This pivot feature allows the user to orient the microphone in a variety of differing directions.

The guide may have a curved shape, which reduces the space needed to store the microphone assembly. The shape also allows the microphone to extend along a curve to permit the microphone to be easily swiveled. In this design, microphone entrance openings at the free end of the microphone are preferably arranged such that they may point in different directions through swiveling movement. The cross-section of the microphone unit along the curve is preferably circular. A clip may be provided that securely holds the microphone in place. The clip may simply be a slot that receives an elastic protrusion from the microphone, to retain the microphone in its retracted position.

The invention further relates to a hands-free telephone for a vehicle that employs the inventive microphone assembly. By simply extending the microphone, the telephone may be switched "on". The telephone may also have other features. In one version, only the microphone is switched "on", for example during a phone call. In another version, the telephone gives the user the option to accept an incoming phone call. A further possible function is switching on a hands-free mode by activating the microphone. The hands-free telephone may also permit voice dialing.

DETAILED DESCRIPTION OF THE PREFERRED EMBODIMENTS

Figure 1:
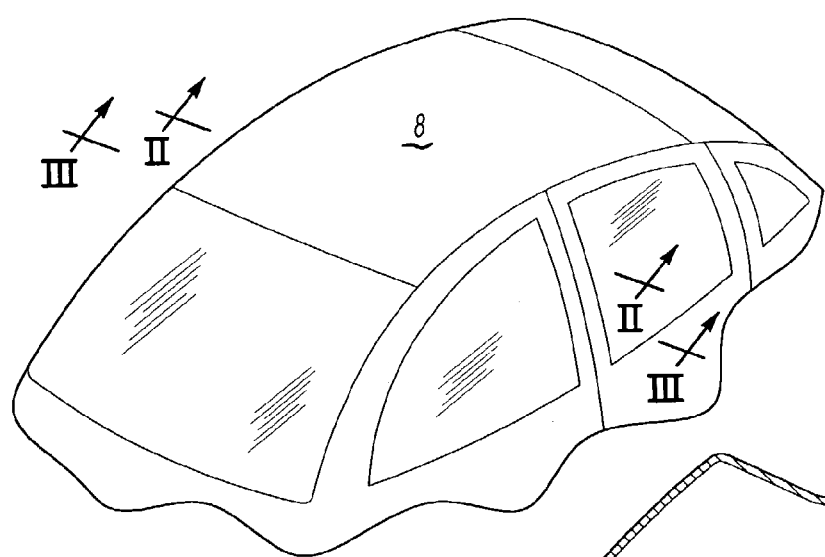
FIG. 1 shows a top view of a vehicle roof, with a microphone assembly according to the invention integrated in a roof liner.
Figure 2:
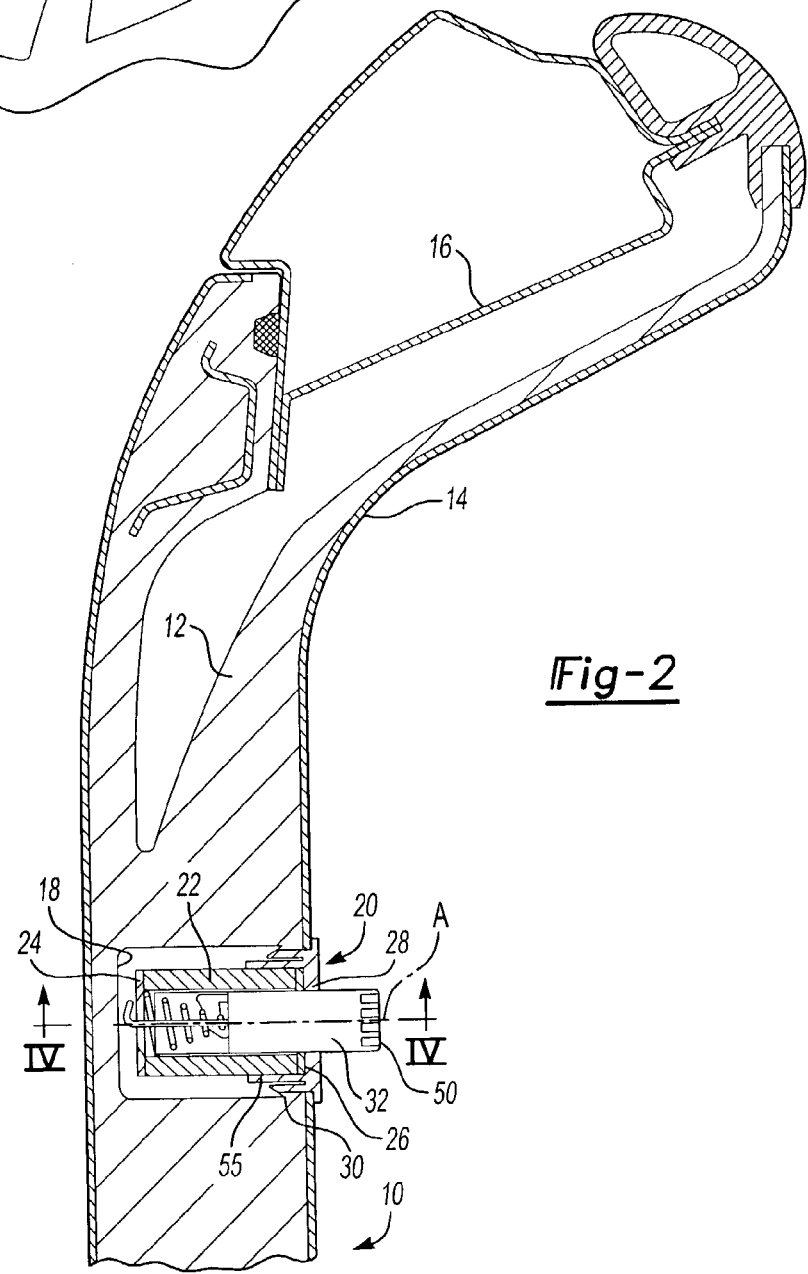
FIG. 2 shows a section through the vehicle roof in the region of the microphone assembly along line II—II, as shown in FIG. 1.

FIG. 1 illustrates a vehicle roof 8, having an interior facing headliner 10 (see FIG. 2). The headliner 10 has a layer of foamed material 12 and a smooth inner skin 14. Roof frame 16 is located proximate inner skin 14. The headliner 10 has an open recess 18, which can be formed with headliner 10 or cut out later. A microphone assembly 20, which is preferably formed as a pre-assembled unit, is inserted in the recess 18. The microphone assembly 20 is connected to a vehicle telephone system through cables and forms part of a vehicle installed hands-free telephone 21 (shown in FIG. 3).

Figure 3:
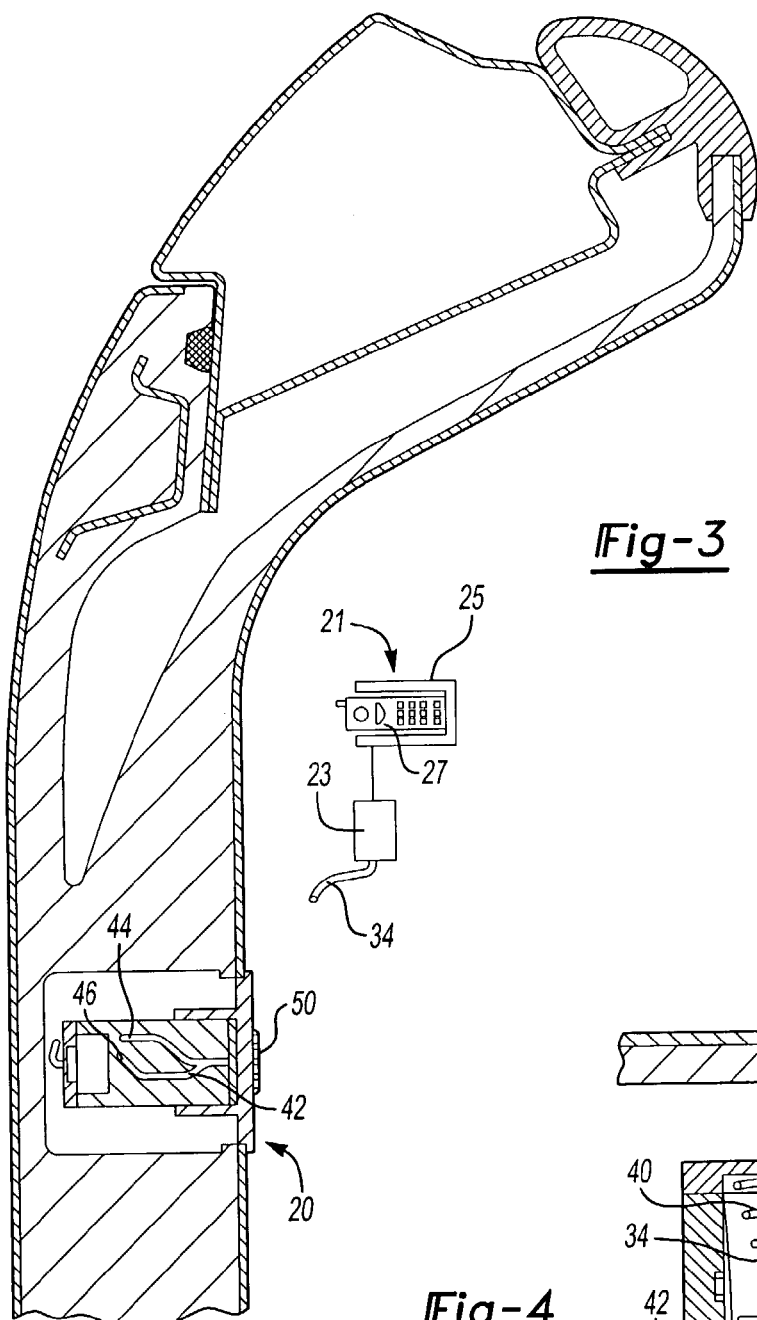
FIG. 3 shows a hands free telephone according to the invention and a section through the vehicle roof according to line III—III, as shown in FIG. 1.

FIG. 3 somewhat schematically shows a hands-free telephone 21. As shown, hands-free telephone 21 comprises the microphone assembly 20, a control unit 23 and a support 25 for a removable telephone handset 27. Alternatively, as known, the telephone may also be permanently installed in a vehicle. The details of the telephone handset 27, control unit 23 and support 25 may be generally as known.

As shown in FIG. 2, the microphone assembly 20 has relatively few parts. A cylindrical bushing 22, an upper lid 24, and a lower lid 26, both connected to the bushing 22, form an outer housing for the microphone assembly 20. At the lower end of the bushing 22 and along the lower lid 26, there is a sleeve 28 that forms a fastening device to fasten the microphone assembly 20 to headliner 10. Sleeve 28 comprises lateral and elastic latching teeth 30 that engage the layer of foamed material 12.

Figure 4:
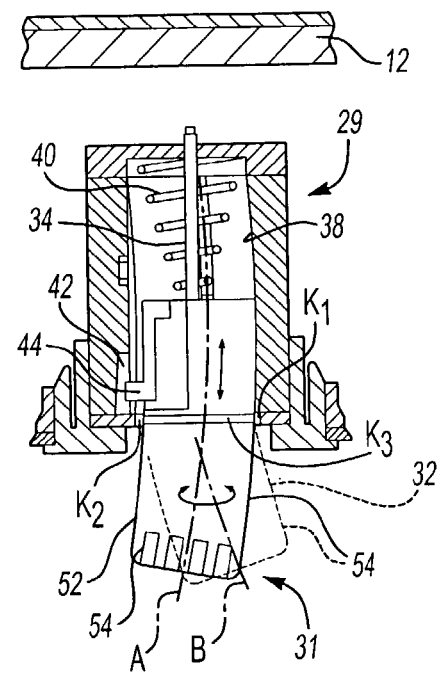
FIG. 4 shows an enlarged section through the microphone assembly, and the vehicle roof taken along line IV—IV, as shown in FIG. 2.

As seen in FIG. 4, the bushing 22 forms a longitudinal guide 29 for a microphone unit 32 inserted into bushing 22. The microphone unit 32 has the shape of a laterally curved cylinder having a curve-shaped along center arc A. That is, the cross-section of microphone unit 32 is circular along the curved shape. Protruding from the rear side of the microphone unit 32 is a connecting cable 34, which extends through an opening in the upper lid 24 and to the control unit. An inner surface 38 of guide 29 generally defines a curved wall extending along a center arc which is coincident with the arc A.

A conical wire spring 40 is positioned between a rear side of the microphone unit 32 and the upper lid 24. The conical wire spring 40 serves both as an energy storage unit and a drive for extending the microphone unit 32. The microphone unit 32 is movable between a retracted position (shown in FIG. 3), where microphone unit 32 is almost completely received in the bushing 22, and an extended position (shown in FIG. 2), where microphone 32 extends out of bushing 22, as will be explained in more detail below.

Bushing 22 also has a clip. As can be seen in FIGS. 3 and 4, the clip comprises a slot 42 that is provided on the inner surface 38 of the bushing, with a finger-like, laterally resilient protrusion 44 of the microphone unit 32 projecting into slot 42. The slot 42 is shown, although in fact it is behind the microphone unit 32 in this view.

FIG. 3 illustrates the protrusion 44 located in a V-shaped region 46 of the slot 42. If the protrusion 44 is located in this V-shaped region, the microphone unit 32 is in the retracted position and is prevented from extending. When there is an incoming phone call, or the vehicle occupant wants to switch on the microphone unit 32, perform voice-controlled dialing, or wants to otherwise activate the microphone unit 32 and telephone 21, then the vehicle occupant presses against an end face 50 of the microphone unit 32, which is virtually completely retracted (see FIG. 3). The microphone unit 32 is pressed upwards slightly, so that the protrusion 44 is moved out of the illustrated point in the region 46 and moves along a leg of the "V" in upward direction. As seen from the uppermost end of each leg of the "V", there extend vertically descending portions 47 of the slot 42. As soon as the microphone unit 32 is pressed upwards a sufficient amount, microphone unit 32 may be released and its protrusion 44 is forced downwards along one of the two vertically descending portions 47 of the slot 42 by the spring drive. The microphone unit 32 is brought into the extended position along a curved-shaped path, which corresponds to arc A. In this extended position (FIG. 4), two opposing contacts $K_1$, $K_2$ are connected by a ring-shaped contact $K_3$ on the microphone unit 32, thereby closing an electric circuit to signal the control unit 23 that the microphone unit 32 has been extended and turned "on." Contacts $K_1$ and $K_2$ are connected to achieve this feature as is used within the skill of a worker in this art.

As microphone unit 32 extends, a damping effect slows the extension of microphone unit 32. This damping effect may result from friction between the guide 29 and the microphone unit 32. Specifically, an outer envelope surface 52 of the microphone unit 32 represents a guide surface, which slows movement of microphone unit 32 through friction between guide 29 and envelope surface 52.

As shown in FIG. 4, when completely extended, the microphone unit 32 can be swiveled with guide 29, so that the free end 31 of microphone unit 32 protruding from the guide 29 preferably travels along an eccentric or a circular path B. The curved-shaped form of the guide 29 and the envelope surface 52, i.e., the outer contour of the cylinder defining the microphone unit 32, permits free end 31 to travel this path.

By swiveling free end 31, the microphone unit 32 may be given a different orientation for receiving sound because the microphone entrance openings 54 on the end face 50 and partially on the envelope surface 52 will point in different directions as free end 31 swivels. In so doing, the microphone unit 32 can be directed by the driver or the passenger.

The curved-shaped guide 29 and the microphone unit 32 are adapted to each other to permit swiveling in the extended position. For example, as shown in FIG. 4, the bushing 22 and/or the end of the microphone unit 32 projecting into the guide 29 has sufficient clearance between upper end of the microphone unit 32 and guide 29 so as to be yielding. As illustrated in FIGS. 2 and 3, microphone unit 32 may be rotated or swiveled in a cylindrical receptacle 55 of the sleeve 28 in bushing 22. The sleeve 28 may act as a slide bearing for the microphone unit 32. That is, the microphone unit 32 swivels with bushing 22 in receptacle 55. The curved shape of the bushing 22 and microphone unit 32 will cause the bushing 22 to swivel when the operator swivels the microphone unit 32. The swiveling motion can be less than 180 degrees. An endless rotation, however, is also possible and within the knowledge of one of ordinary skill in the art to accomplish.

For switching the telephone to the "off" state, one simply pushes the microphone unit 32 back into guide 29 until the protrusion 44 again is located in the lowermost place of the "V". The contacts $K_1$, $K_2$ are no longer connected by contact $K_3$. Moreover, the energy applied by the vehicle user by pushing the microphone unit 32 back into the retracted position is stored in the spring 40.

Figure 5:
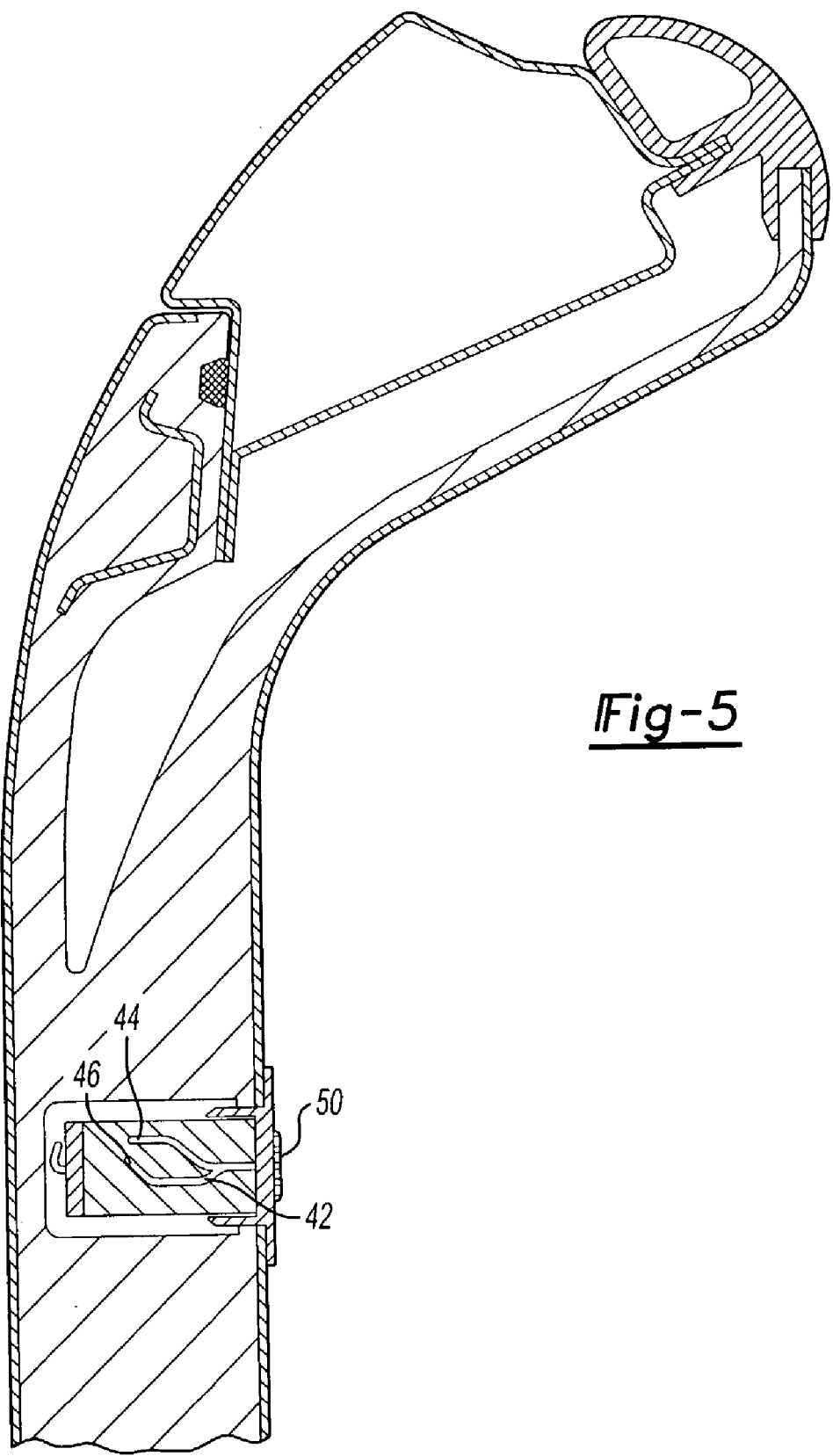
FIG. 5 shows a cross-sectional view along line II—II, as shown in FIG. 1 with a microphone assembly according to a second embodiment.
Figure 6:
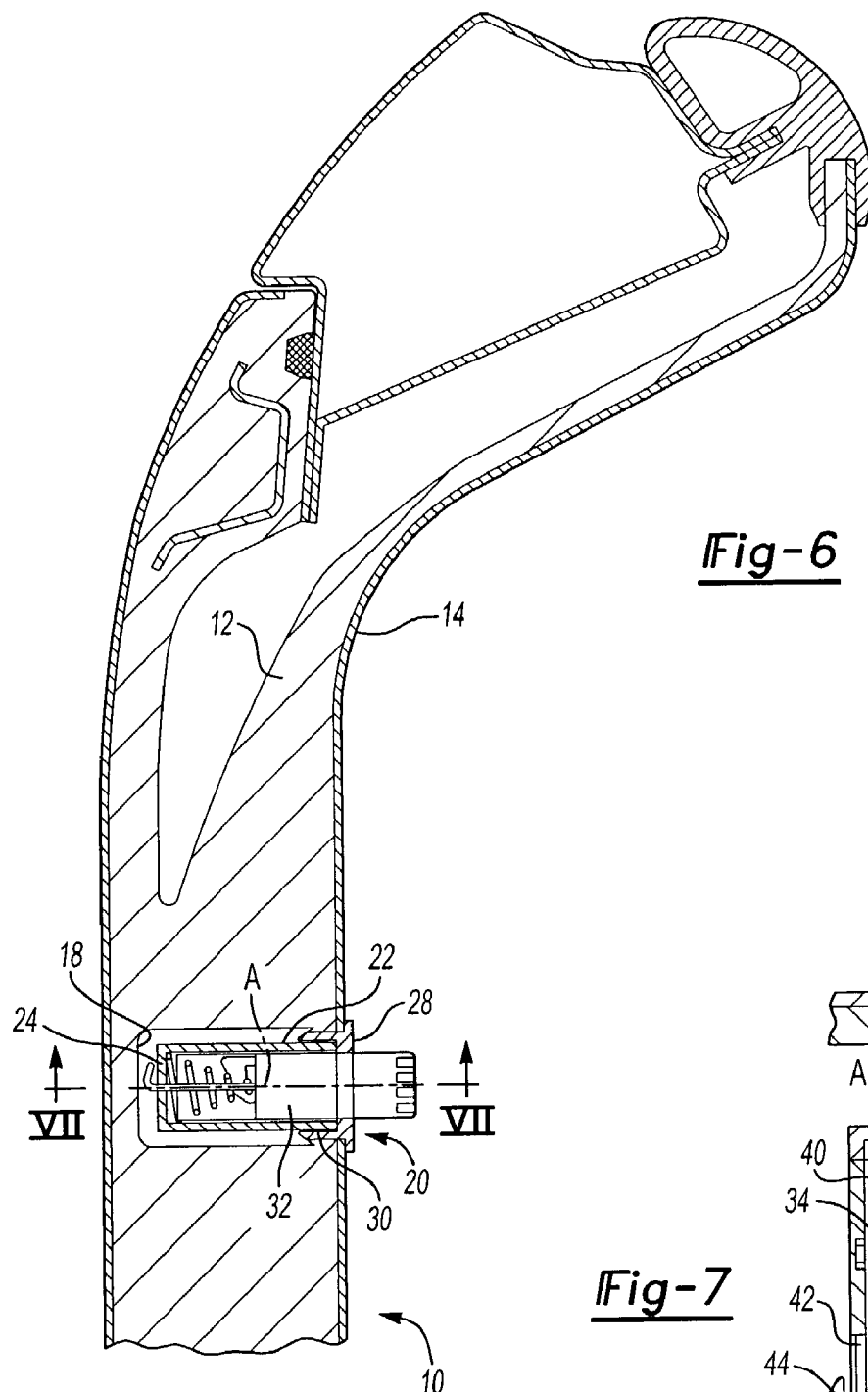
FIG. 6 shows a cross-sectional view along line III—III, as shown in FIG. 1 with the microphone assembly according to the second embodiment.
Figure 7:
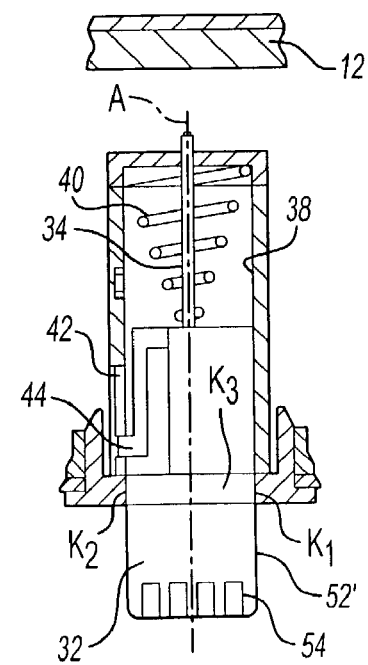
FIG. 7 shows an enlarged section through the microphone assembly and the adjoining vehicle roof taken along line VII—VII, as shown in FIG. 6.

The embodiment according to FIGS. 5 to 7 corresponds substantially to the one described before. In this embodiment, too, the microphone unit 32 is actuatable between a retracted position and an extended position. The guide, i.e. the inner surface 38 of the bushing 22, however, is not curved but instead cylindrical. The microphone unit 32 has a cylindrical envelope surface 52', too, that permits a linear motion along axis A between the retracted position and the extended position.

Here too, a variable orientation microphone of the unit 32 is possible in the extended position. Microphone entrance openings 54 may be provided only at specific circumferential locations on the envelope surface 52'. The microphone entrance openings 54 are either oriented towards the driver or the passenger, when the microphone unit 32 is rotated in the guide about axis A. In this embodiment, the lower lid 26 has been omitted because sleeve 28 assumes the function of lower lid 26. FIGS. 5, 6 and 7 roughly correspond to the positions of FIGS. 2, 3 and 4 respectively, but showing the second embodiment.

Although preferred embodiments of this invention have been disclosed, a worker of ordinary skill in this art would recognize that certain modifications will come within the scope of this invention. For that reason the following claims should be studied to determine the true scope and content of this invention.

The invention claimed is:

1. A microphone assembly for a hands-free telephone to be used in a vehicle, comprising:
   a guide adapted for mounting to a vehicle, said guide comprising a bushing mountable within a vehicle headliner; and
   a microphone unit for a hands-free telephone, said microphone unit being selectively movable within said bushing between a retracted position in which said microphone unit is deactivated and an extended position in which said microphone unit is activated wherein said microphone unit is substantially enclosed within said guide in said retracted position by moving the microphone unit into said bushing and wherein said microphone unit protrudes outwardly from said guide when in said extended position by moving the microphone unit out of said bushing.

2. The microphone assembly of claim 1, wherein said microphone unit has an electrical circuit trace which completes a contact circuit when in said extended position, and does not complete said contact circuit when in said retracted position.

3. The microphone assembly of claim 2, wherein a pair of spaced contacts is formed within said guide, and said electrical circuit trace on said microphone unit connects said pair of spaced contacts to complete said contact circuit when said microphone unit is in said extended position.

4. The microphone assembly of claim 1, including a fastening device for fastening said guide to a lining of a vehicle interior.

5. The microphone assembly of claim 4, wherein said fastening device comprises a latching device.

6. The microphone assembly of claim 1, including a drive to move said microphone unit between said retracted position and said extended position.

7. The microphone assembly of claim 6, wherein said drive comprises an energy storage device including a spring.

8. The microphone assembly of claim 1, wherein said microphone unit is movable into said extended position by pressing said microphone unit into said guide.

9. The microphone assembly of claim 1, wherein contacting surfaces on said microphone unit and said guide create friction to provide a damping effect that slows movement of said microphone unit between said retracted position and said extended position.

10. The microphone assembly of claim 1, wherein said microphone unit swivels.

11. The microphone assembly of claim 1, wherein said guide is curved-shaped.

12. The microphone assembly of claim 11, wherein said microphone unit has a curved-shaped guide surface cooperating with said guide to move said microphone unit into said extended position along an arcuate path.

13. The microphone assembly of claim 12, wherein said microphone unit has a circular cross-section along said guide.

14. The microphone assembly of claim 1, wherein said microphone unit comprises a free end having microphone entrance openings oriented to receive sound from a particular direction.

15. The microphone assembly of claim 1, including a clip to retain said microphone unit in said retracted position.

16. The microphone assembly of claim 15, wherein said clip comprises a slot in an inner portion of said guide.

17. The microphone assembly according to claim 16, wherein said clip includes a protrusion on said microphone unit, said protrusion projecting into said slot in said retracted position.

18. A hands free telephone assembly for a vehicle, comprising:
   a hands-free telephone;
   a guide adapted for mounting to a vehicle, said guide comprising a bushing mountable within a vehicle headliner; and
   a microphone unit in communication with said hands-free telephone, said microphone unit selectively movable within said bushing between a retracted position wherein said microphone unit is moved into said bushing and an extended position wherein said microphone unit is moved out of said bushing, and wherein said microphone unit is substantially enclosed within said guide in said retracted position and wherein said microphone unit protrudes outwardly from said guide in said extended position.

19. The hands free telephone assembly of claim 18, wherein said microphone unit is activated when in said extended position to extend outwardly from the vehicle headliner and is deactivated in said retracted position, and with said microphone unit moving inwardly toward the vehicle headliner to be received within said bushing.

20. The microphone assembly of claim 1, wherein said bushing is received within a foam layer of the vehicle headliner, said microphone unit being slidably received within said bushing, and including a fastening sleeve surrounding a portion of said guide to secure said guide directly to the vehicle headliner.

* * * * *